Patented July 27, 1948

2,446,091

UNITED STATES PATENT OFFICE 2,446,091

METHOD OF EXTRACTING GELOSE FROM SEAWEEDS SUCH AS HYPNEA MUSCIFORMIS AND OTHER SPECIES OF THE GENUS HYPNEA

Harold Judson Humm, Beaufort, N. C., assignor to Duke University, Incorporated, Durham, N. C.

No Drawing. Application August 6, 1945, Serial No. 609,328

13 Claims. (Cl. 260—209.6)

This invention relates to a method of extraction of gelose from a marine seaweed known as *Hypnea musciformis*, as well as other species of the genus Hypnea; and also to the method of treating gelose produced from said seaweed so as to controllably vary desired characteristics thereof, such as its temperature of gelation, melting point and gel strength. The invention also relates to the product obtained from the aforesaid methods.

It is an object of the invention to provide a novel method of extraction of gelose from *Hypnea musciformis* and other species of the genus Hypnea.

Another object is to provide a method, as aforesaid, by which a gelose may be produced at a cost that compares favorably with the cost of production of Gelidium agar, while resulting in a product that, for certain purposes is superior to Gelidium agar.

A further object is to provide a method that enables the production of gelose having desired qualities of temperature of gelation, melting point and gel strength while at the same time resulting in a superior quality of gelose exactly suited for its intended purpose.

A further object is to provide a gelose that is pure, that has a translucency superior to similar products known at the present time, and that has a gel strength greater, when desired, than the commercial Gelidium agar of the same concentration and treatment.

In this disclosure, the term "temperature of gelation" is meant that temperature at which gelation, solidification, or congealing of the solution of seaweed extractive occurs when it is allowed to cool. By "melting point" is meant that temperature at which the solidified or gelated extractive melts or becomes liquid when heated. By "gel strength" is meant the resistance which the gelated seaweed extractive offers to penetration or puncture under standard conditions of temperature and pressure. The term "one percent solution" means a solution prepared with one part of washed and dried *Hypnea musciformis* to 100 parts of fresh water.

*Hypnea musciformis* is a marine seaweed which occurs in abundance along the Atlantic coast of North America from Massachusetts southward to Key West, Florida, as well as along the coast of the Gulf of Mexico. Botanically, it belongs to the group of plants known as red algae in the class Rhodophyceae, order of Gigartinales, family Hynaceae. Several other species of the genus Hypnea, suitable for treatment according to the invention, are found along the coast of southern Florida, and South America.

In producing gel from Hypnaceae or *Hypnea musciformis*, the collected seaweed is spread out to dry. When dry it is washed thoroughly but briefly with fresh water, to remove sea salts. After washing, it is again dried. Following this, the washed dried weed is placed in fresh or distilled water in the preferred ratio of one part of dry seaweed to 100 parts of water. The water is then heated to a temperature of 45° to 60° C. (113°–140° F.) at atmospheric pressure, and held at that temperature for a period of one and one-half to two hours. Alternatively, satisfactory results may be obtained by using 20 to 30 parts of water to each part of dry Hypnea and boiling for one hour.

Under such treatment, a maximum amount of extractive will be obtained by a single extraction. I have discovered that with seaweed *Hypnea musciformis* collected during the months of January to June, the yield of gelose from a single extraction will be from 40 to 50 per cent of the dry weight of the seaweed. A second extraction from the residue of the first extraction may be made in the same manner except only that one-half the volume of water is used per part of residue as was used for the first extraction. If the first extraction gives a yield above 40 per cent of the dry weight of seaweed used, it is probable that the second extraction will not yield more than 10 per cent of the dry weight of seaweed or residue.

Hypnea collected during the latter part of its annual growing season, when growth has slowed down or ceased, does not yield its extractive so readily. I have found that seaweed collected during the latter part of the year gives a more satisfactory yield if glacial acetic acid up to five parts of acid per thousand parts of water, is added. When such acid is used, the temperature of the liquid during the extraction process, should not rise above 60° C.

The gel resulting from the process just described, has greater clarity or translucency, greater gel strength, and a relatively lower melting point, than agar of commerce (Gelidium agar). Tests have indicated that the gel so produced may be superior to Gelidium agar for many purposes; and its value for use in connection with the bacteriological culture media has been proven.

I have also discovered that the gel produced by my process, may be so treated as to accurately control the temperature of gelation within the limits of approximately 10° to 70° C. (50° to 158° F.).

A solution extracted from Gelidium, Gracilaria and similar seaweeds, gelates when virtually free from solutes. The extractive from *Hypnea musciformis* and similar seaweeds, when cooled, forms a viscous liquid in the absence of solutes. I have found that the liquid extractive of *Hypnea musciformis*, solidifies to form a gel having properties superior for certain purposes to a comparable product of Gelidium agar or the like, when small quantities of certain common salts are added to the extractive prior to cooling. Furthermore, I have found that by varying the amount of such salts added, per unit volume of liquid extractive, the important properties of the resulting gel, namely, temperature of gelation, melting point and gel strength, may be accurately controlled and varied, while at the same time giving a product that has superior qualities of pellucidness.

While numerous solutes may be used to produce a gel having the desired properties, I have found potassium chloride to be especially effective, as well as inexpensive. As is well known, KCl is a harmless salt found universally in the body fluids of humans, animals and the cell sap of plants, so that its presence in a gel either for use in the culture of bacteria or as a food, is entirely unobjectionable, in low concentrations.

As a first example of one mode of practicing the invention, 10 to 20 grams of dried and washed *Hypnea musciformis* were placed in one liter of fresh water and heated to a temperature of 50° C. (122° F.) for one hour. The gelose extractive thus obtained was separated from the seaweed residue and filtered by the known procedure in preparing Gelidium agar. To the filtered liquid was added 0.20% of KCl and the temperature of the solution was raised to about 60° C. (140° F.) for a few minutes. The solution was then stirred and allowed to cool. The result was a firm clear gel characterized by a gelatin temperature of between 28° and 31° C. (82° and 88° F.) and a melting point of 44° to 47° C. (101° to 116° F.). The gel strength was substantially greater than that of a solidified solution of Gelidium agar of the same concentration, either with or without the addition of potassium chloride.

As a second example, a one percent solution of dried extractive of *Hypnea musciformis* was made with distilled water, and 0.30% of KCl by weight was added. The solution was treated in the same manner as is explained supra in connection with the first example. The temperature of gelation of the resulting product was found to be about 35° C. and the melting point about 50° C. The gel strength of the solidified product is approximately one and one-half times that of a commercial one percent solution of Gelidium agar, either with or without the addition of KCl.

As a third example, a one percent solution of the dried extractive of *Hypnea musciformis*, was made as in the second example, and 0.40% of KCl was added. The resulting solution was found to have a temperature of gelation of 39° to 40° C. and a melting point of approximately 55° C. The gel strength was found to be slightly greater than that of the gel prepared as a 0.30% KCl solution.

The following table gives the effects upon the characteristics of a one percent Hypnea gelose with varying percentages of potassium chloride. For convenience in use, both centigrade and Fahrenheit temperatures are given, fractional values being omitted.

TABLE I

*Effects of varying percentages of KCl on a one percent Hypnea gelose*

| KCl Per Cent | Temp. of Gelation | | Melting Point | |
|---|---|---|---|---|
| | ° C. | ° F. | ° C. | ° F. |
| 0.1 | 10 | 50 | 35–36 | 95–97 |
| 0.2 | 35 | 95 | 49–50 | 120–122 |
| 0.3 | 38 | 100 | 52–53 | 126–127 |
| 0.4 | 40 | 104 | 56 | 133 |
| 0.5 | 43 | 109 | 59–60 | 138–140 |
| 0.6 | 45 | 113 | 62 | 144 |
| 0.8 | 48 | 118 | 66 | 151 |
| 1.0 | 53 | 127 | 70 | 158 |
| 2.0 | 65 | 149 | 86 | 187 |
| 2.5 | 68 | 154 | 88 | 190 |

In addition it will be found that the gel strength of gels made from Hypnea gelose, increases with an increased percentage of KCl. For example, a gelose having 0.1% of KCl has a very low gel strength, while if 0.3% of KCl is added, the gel strength is one and one-half times as great as a commercial one percent solution of agar, and three times as great as a commercial one percent solution of agar with 2.5% of KCl added.

I have further discovered that with a constant low percentage of KCl, or similar salt, the gel strength of the Hypnea gel varies with the concentration of the gelose. This is shown by the following table where the first column gives the percentage concentration of Hypnea gelose, the second column gives the corresponding gel strength in grams, and the third and fourth columns give, respectively, the temperature of gelation and melting point. The figures given are for gels having a constant 0.5% of KCl.

TABLE II

*Variation in characteristics of Hypnea gel having 0.5% KCl, with variation in percentage of gelose*

| Per Cent of Hypnea Gelose | Gel Strength | Temperature of Gelation | | Melting Point | |
|---|---|---|---|---|---|
| | | ° C. | ° F. | ° C. | ° F. |
| 0.3 | 5.0 | 42 | 107.6 | 56 | 132.8 |
| 0.6 | 6.5 | 42.5 | 108.5 | 60 | 140.0 |
| 1.0 | 13.5 | 42.5 | 108.5 | 59 | 138.2 |
| 1.5 | 20.0 | 44.0 | 111.2 | 62 | 143.6 |
| 2.0 | 30.0 | 45.0 | 113.0 | 64 | 147.2 |

Table II shows that with a Hypnea gel having a constant percentage of 0.5% KCl, the gel strength increases out of proportion to the corresponding percentage increase of gelose. For example, an increase in gelose concentration from 0.3% to 2.0%, increases the gel strength six-fold. Indeed, the 2.0% gelose identified in Table II has a gel strength of about twice that of a 2.0% solution of Gelidium agar, either with or without KCl. Table II also shows that the temperature of gelation and melting point of Hypnea gels does not vary greatly, regardless of the percentage of Hypnea gelose therein. For example, while an increase of 1.7% in the concentration, namely, from 0.3% to 2.0%, increases the gel strength six-fold, the temperature of gelation is thereby raised only 3° C. or from 42° C. to 45° C. Likewise the melting point is increased only by 8° C. or from 56° C. to 64° C.

Thus I have discovered that gel strength of Hypnea gel may be modified or varied by varying the percentage of gelose, as shown in Table II.

As previously explained, the gel strength may also be modified or varied by varying the concentration or percentage of KCl. The maximum gel strength resulting from increased percentages of KCl is attained when the concentration of KCl is between 1.5% and 2.0%. Further increase in the percentage of KCl produces no corresponding increase in gel strength but does produce an increase in the temperature of gelation and melting point.

The combined disclosures embodied in Tables I and II suggest the manner in which a gel may be prepared that, within physical limits, may have any desired characteristic. If a gel of relatively low temperature of gelation, low melting point and gel strength, is desired, the characteristics may be obtained either by a low percentage of KCl for a constant percentage of Hypnea gelose, or by a low percentage of Hypnea gelose for a constant percentage of KCl. If a gel of relatively high temperature of gelation, melting point and gel strength is desired, it may be obtained either by increasing the percentage of KCl or the percentage of gelose, or both. Furthermore, the relation between temperature of gelation and melting point, upon the one hand, and gel strength upon the other, may be varied within limits by increasing the percentage of KCl beyond 2.0%, since increasing the percentage of the salt beyond that point does not materially increase the gel strength while it does increase the melting point and temperature of gelation.

It has been previously explained that potassium chloride is a harmless salt in low concentrations, and that the percentages necessary to produce a gel having properties equal or superior to commercial Gelidium agar, are not objectionable either from a bacteriological or a nutritional point of view. In fact, a salt solution of 0.85% is known to biologists as a "physiological salt solution" because it closely approximates the salt concentration of fluids of the human body. Thus the presence in a gel of a salt concentration of 2.5% or less is not objectionable and gels so obtained may be used in all cases where a similar commercial form of Gelidium agar might be substituted, whether the purpose be for the preparation of edible products or for bacteriological or other purposes.

Hypnea agar prepared with potassium chloride is neutral from the standpoint of its use in bacteriological culture media in that it does not serve as a source of either nitrogen or carbon, except that it may serve as a carbon source for agar-digesting bacteria. However, it will be appreciated that numerous other salts are capable of use in place of potassium chloride and will give comparable and satisfactory results. Among such salts may be mentioned potassium nitrate, potassium sulphate, ammonium chloride, caesium chloride, and others. As an example, a one percent solution of dried extract of *Hypnea musciformis* made up in distilled water and to which a quantity of $K_2SO_4$ is added equivalent to a 0.3% solution of KCl, will have a temperature of gelation of about 35° C. (95° F.) and a melting point of about 49° C. (120° F.). The gel strength will be about 25% below that of the corresponding gel of 1% extract and 0.3% KCl.

If a one percent solution of dried extract of *Hypnea musciformis* is made up in distilled water and a quantity of caesium chloride is added, to make a solution equivalent to a 0.3% solution of KCl, the resulting temperature of gelation is about 38° C. (100° F.), while the melting point is about 57° C. (135° F.). The gel strength will be about one and one-half times as great as with a 0.3% KCl solution.

Syneresis in Hypnea gels, made by the addition of KCl is in some cases greater than that exhibited by Gelidium agar. For example, syneresis may be high in Hypnea gels in which the concentration of Hynea extract is below 1.5%. With increasing concentrations of KCl I have found that syneresis decreases and also that syneresis decreases with increase in the concentration of Hypnea extract for a fixed percentage of KCl. Hypnea gels having a concentration of 1.5 to 2.0 percent seem to exhibit only a small amount of syneresis. Such gels will not show syneresis too great for use in bacteriological culture media.

As previously stated, Hypnea gelose may be substituted for the agar of commerce in making culture media. Particularly satisfactory results may be expected in the cultivation of such bacteria as *Staphylococcus aureus* and *Escherichia coli*. No reason appears why the gelose of my invention will not be equally satisfactory for many other species.

While I have disclosed a preferred method for preparation of Hypnea gelose, it will be understood that such disclosure is by way of example only and hence is to be interpreted in an illustrative sense only, and not in a limiting sense. Furthermore, the mention of certain specific chemicals suitable for use in controlling the desired characteristics of Hypnea gels, is merely illustrative of the best manner of practising the invention as now known to me. The matter of testing various substances and percentages to discover their effects upon temperature of gelation, melting point and gel strength can be carried out by experiment. Hence I do not wish to be limited to the precise procedure, percentages and chemicals mentioned. On the contrary the invention extends to all such temperatures, percentages, chemicals, steps, modifications and substitutions as fall within the scope of the subjoined claims.

Having now fully disclosed the invention, what I claim and desire to secure by Letters Patent is:

1. The method of preparing gelose, comprising, steeping washed and dried *Hypnea musciformis* in fresh water, at a temperature of from 45° C. to 60° C. and in the proportions of from about 0.3 to 2.0 parts of *Hypnea musciformis* to one hundred parts of fresh water, and filtering the resulting liquid.

2. The method of preparing a gel, comprising, boiling for approximately one hour in fresh water, a quantity of seaweed of the genus Hypnea, in the proportions of 20 to 30 parts of water to one part of seaweed, filtering the resulting aqueous extract, and dissolving therein 0.1% to 2.5% by weight of potassium chloride.

3. That method of preparing a gelose extractive, comprising, steeping for about one hour to two hours, in a quantity of fresh water at 45 degrees to 60 degrees centigrade, a quantity of washed and dried seaweed of the genus Hypnea in the approximate proportions of 0.3% to 2.0% parts of seaweed to 100 parts of water, filtering the resulting liquid, dissolving in the said resulting liquid 0.1 to 2.5% of a material selected from the group consisting of potassium nitrate, potassium sulphate, ammonium chloride, caesium chloride and potassium chloride, and cooling the resulting solution.

4. That method of preparing gel comprising steeping for a predetermined time a measured quantity of seaweed *Hypnea musciformis* in a measured quantity of fresh water in the proportions of from 0.3 to 2.0 parts of *Hypnea musciformis* to one hundred parts of fresh water and at a temperature of 45° to 60° C. and dissolving in the resulting solution not more than approximately 2.5% by weight of material selected from the group potassium nitrate, potassium sulphate, ammonium chloride, caesium chloride and potassium chloride.

5. In a process of preparing gel, the steps comprising, steeping for approximately one and one-half to two hours, a quantity of dried *Hypnea musciformis* in a quantity of fresh water in the approximate proportion of one part *Hypnea musciformis* to 100 parts of water, filtering the resulting liquid, dissolving in said liquid 0.1% to 2.5% by weight of potassium chloride, and cooling the solution to form a gel.

6. The process of causing gel formation in an aqueous extract of gelose obtained from the genus Hypnea, consisting in the addition to said aqueous extract of material selected from the group consisting of potassium nitrate, potassium sulphate, ammonium chloride, caesium chloride and potassium chloride.

7. The process of controlling the temperature of gelation, melting point and viscosity in an aqueous extract of gelose obtained from the genus Hypnea, consisting in the addition to said aqueous extract of material selected from the group consisting of potassium nitrate, potassium sulphate, ammonium chloride, caesium chloride and potassium chloride.

8. The method of controlling the temperature of gelation and melting point of gel prepared from an aqueous filtered extract of the genus Hypnea comprising, adding to the filtered liquid a percentage of a material proportional to the temperature of gelation and melting point desired, said material being selected from the group consisting of potassium nitrate, potassium sulphate, ammonium chloride, caesium chloride and potassium chloride.

9. The method of controlling the temperature of gelation of gels made from an aqueous extract of a seaweed of the genus Hypnea, comprising adding to said aqueous extract a percentage of potassium chloride proportional to the desired temperature of gelation.

10. That method of controlling the temperature of gelation, melting temperature, and gel strength of a gelose extract, comprising steeping a quantity of dried seaweed of the genus Hypnea, in fresh water in the proportions of 0.3 to 2.0 parts of seaweed to 100 parts of water, at a temperature of between 45 degrees and 60 degrees centigrade, filtering the resulting liquid, dissolving in the filtered liquid an amount by weight of 0.1% to 2.5% of the said filtered liquid of a material selected from the group consisting of potassium nitrate, potassium sulphate, ammonium chloride, caesium chloride and potassium chloride, and cooling the resulting solution, the temperature of gelation and melting point of the resulting solution being directly proportional to the said percentage of said material dissolved.

11. A gel for edible and bacteriological use, consisting of a solidified fresh water extract obtained from the genus Hypnea.

12. A gel prepared from an aqueous extract obtained from *Hypnea musciformis*, characterized by ability to gelate at temperatures between 50 degrees Fahrenheit and 150 degrees Fahrenheit when 0.1% to 2.5%, respectively, of potassium chloride, by weight, is added to the fluid extract.

13. A gel comprising an aqueous extract of the genus Hypnea having added thereto a solidifying agent from the group consisting of potassium nitrate, potassium sulphate, ammonium chloride, caesium chloride and potassium chloride.

HAROLD JUDSON HUMM.

REFERENCES CITED

The following references are of record in the file of this patent:

Chemical Abstract, vol. 7, pages 2430–2434.